United States Patent [19]
Colotti

[11] Patent Number: 5,537,305
[45] Date of Patent: Jul. 16, 1996

[54] SYNCHRONOUSLY TUNED POWER CONVERTER METHOD AND APPARATUS

[75] Inventor: James Colotti, Wantagh, N.Y.

[73] Assignee: Telephonics Corporation, Farmingdale, N.Y.

[21] Appl. No.: 320,685

[22] Filed: Oct. 11, 1994

[51] Int. Cl.[6] .............................. H02M 1/12; H02J 1/02
[52] U.S. Cl. ................................................ 363/39; 327/45
[58] Field of Search ........................... 363/39, 40; 327/39, 327/44–46

[56] References Cited

U.S. PATENT DOCUMENTS

| | | | |
|---|---|---|---|
| 3,863,134 | 1/1975 | Pollard | 321/5 |
| 3,955,353 | 5/1976 | Astle | 58/230 A |
| 3,958,169 | 5/1976 | Hergenhan | 321/2 |
| 4,017,744 | 4/1977 | Johnson | 307/252 Q |
| 4,030,015 | 6/1977 | Herko | 321/020 |
| 4,188,585 | 2/1980 | Wissel | 325/492 |
| 4,381,478 | 4/1983 | Saijo | 318/135 |
| 4,386,394 | 5/1983 | Kocher | 363/20 |
| 4,504,897 | 3/1985 | Blackwood | 363/39 |
| 4,567,448 | 1/1986 | Ikeda | 331/25 |
| 4,599,685 | 7/1986 | Hombu | 363/41 |
| 4,606,049 | 8/1986 | Daniel | 375/45 |
| 4,606,076 | 8/1986 | Davis | 455/343 |
| 4,613,826 | 9/1986 | Masuko et al. | 331/14 |
| 4,625,271 | 11/1986 | Chetty | 363/49 |
| 4,692,851 | 9/1987 | Attwood | 363/16 |
| 4,707,775 | 11/1987 | Panse | 363/37 |
| 4,959,596 | 9/1990 | MacMinn | 318/254 |
| 5,043,686 | 8/1991 | Plunkett | 363/39 |
| 5,043,857 | 8/1991 | Kirchberg, Jr. | 363/41 |
| 5,045,712 | 9/1991 | Baggenstoss | 307/29 |
| 5,072,171 | 12/1991 | Eng | 323/283 |
| 5,130,561 | 7/1992 | Elliott | 307/31 |
| 5,166,869 | 11/1992 | Hesterman | 363/25 |
| 5,231,563 | 7/1993 | Jitaru | 363/98 |

Primary Examiner—Matthew V. Nguyen
Attorney, Agent, or Firm—Schweitzer Cornman & Gross

[57] ABSTRACT

An improved switching power supply includes a variable frequency switching circuit. The frequency of the switching circuit is varied to minimize interaction between generated power supply noise and an electronics device powered by the power supply. The operating frequency or frequencies of the powered electronics device are monitored to allow continuous real time control over the switching circuit frequency to be provided.

16 Claims, 2 Drawing Sheets

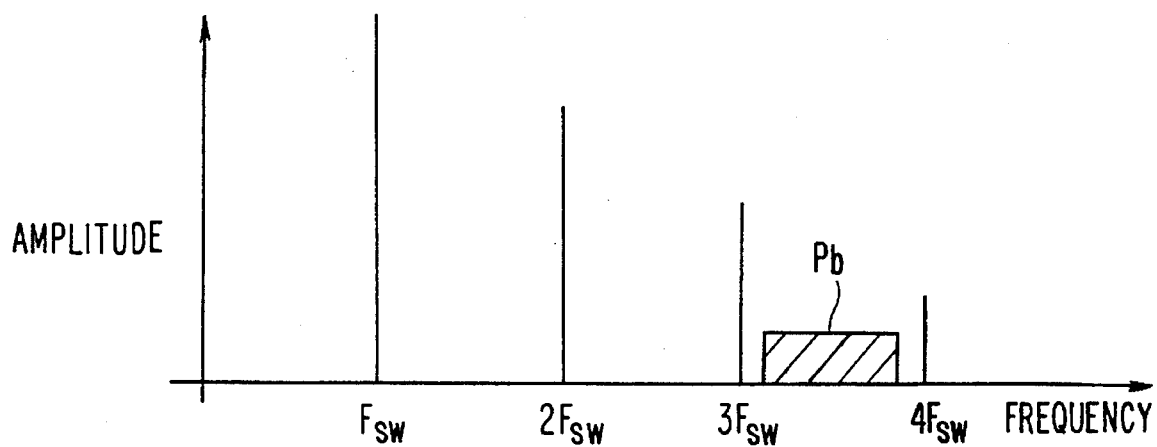
FIG. 2
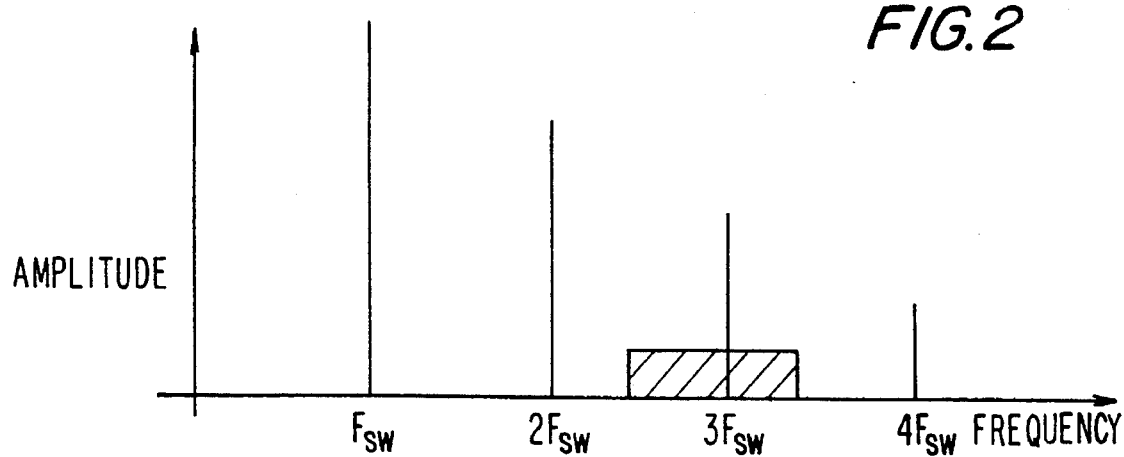
FIG. 3
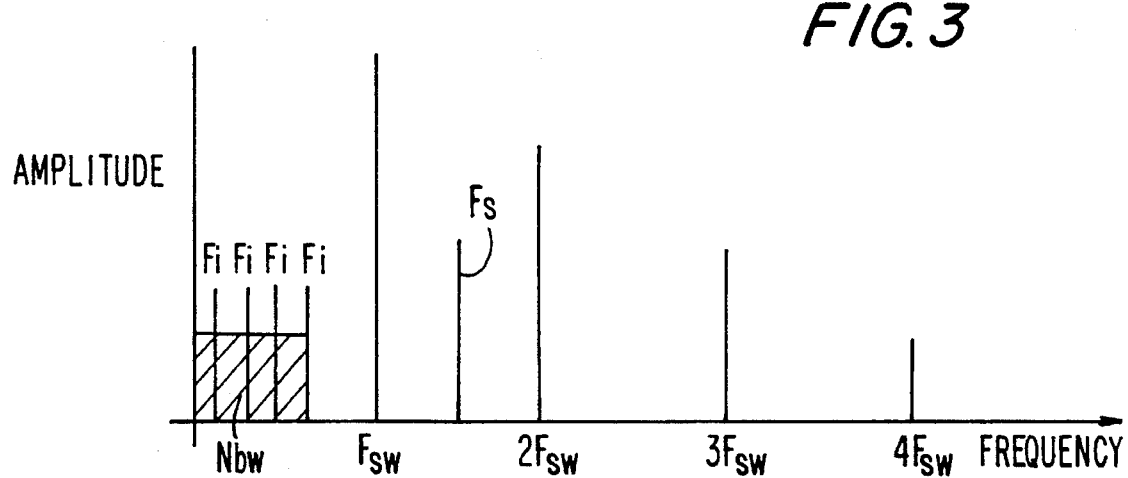

SYNCHRONOUSLY TUNED POWER CONVERTER METHOD AND APPARATUS

The present invention relates to the electronicinput DC voltage. The resulting waveform can be filtered or otherwise processed as needed. The switching frequency is normally fixed and is determined by the component values utilized in the switching circuit. In pulse width modulated (pwm) designs, voltage regulation is accomplished by varying the pulse width of the chopping waveform. In some other designs, however, regulation is accomplished by varying the pulse rate.

The chopping of a DC voltage generates an output waveform which is rich in harmonic content. When the switching power supply is coupled to or is in close physical proximity to sensitive circuits, signals at the switching frequency and its harmonics are often coupled to such circuits, causing interference and degrading their operation.

Typically, this conducted "noise" has been attempted to be attenuated by the use of electronic filtering circuits. In many applications, such an approach is of limited success, as sufficient filtering can be obtained only by the use of costly and or physically large circuit components. As miniaturization and component density increases, such "brute force" filtering becomes less and less attractive. Reducing radiated interference may require the use of shields which can be costly, large or difficult to implement.

It has also been previously attempted to design a switching power supply in which the chopping frequency is at a high frequency, above the frequency band of interest in the associated equipment. This approach is not always practical, since the band of interest may be too high to permit the power converter to operate effectively at a yet higher frequency. In addition, in analog/digital systems such a technique is further limited by the phenomena of imaging of the interferences to lower frequencies which are within the Nyquist bandwidth of the sampling circuits utilized in the analog to digital conversion.

It is accordingly a purpose of the present invention to provide a switching power converter whose interference with other electronics equipment is substantially reduced, if not eliminated.

A further purpose of the present invention is to provide a switching power supply which can dynamically accommodate variations in the reference frequencies of equipment to which it is connected.

Yet a further purpose of the present invention is to provide a switching power supply in which brute force filtering and shielding can be minimized or eliminated for purposes of controlling interference.

BRIEF DESCRIPTION OF THE INVENTION

The above and other objects and purposes are realized in the present invention which incorporates a switching power converter, which may be of the pwm type, the chopping frequency of which is chosen to avoid interference with the sensitive equipment with which it is employed. In general, such equipment may be any type of apparatus in which frequency domain processing is utilized. In a preferred embodiment the chopping frequency can be varied on a continuing basis. Means are provided for determining the sensitive frequencies for the electrical equipment with which the power supply is to be used. This frequency information is then used to determine a primary chopping oscillator frequency which, when considered in conjunction with its generated harmonics, provides for minimal interaction between such frequencies and the sensitive frequencies. By determining the sensitive frequencies on a continuing basis, the frequency of oscillation for the switching oscillator may be varied on a real time basis to provide continuous minimization of interference.

BRIEF DESCRIPTION OF THE DRAWINGS

A fuller understanding of the present invention may be accomplished upon consideration of the following detailed description of a preferred, but nonetheless illustrative embodiment of the present invention, when reviewed in association with the annexed drawings, wherein:

FIG. 1 is a graphical representation of the output of a switching power supply in a non-interfering mode with a reference band of sensitive frequencies;

FIG. 2 is a graphical representation of the output of a switching power supply interfering with a band of interest;

FIG. 3 is a graphical representation of the output of a switching power supply utilized in conjunction with a digital receiver front end.

DETAILED DESCRIPTION OF THE INVENTION

Figure 4:
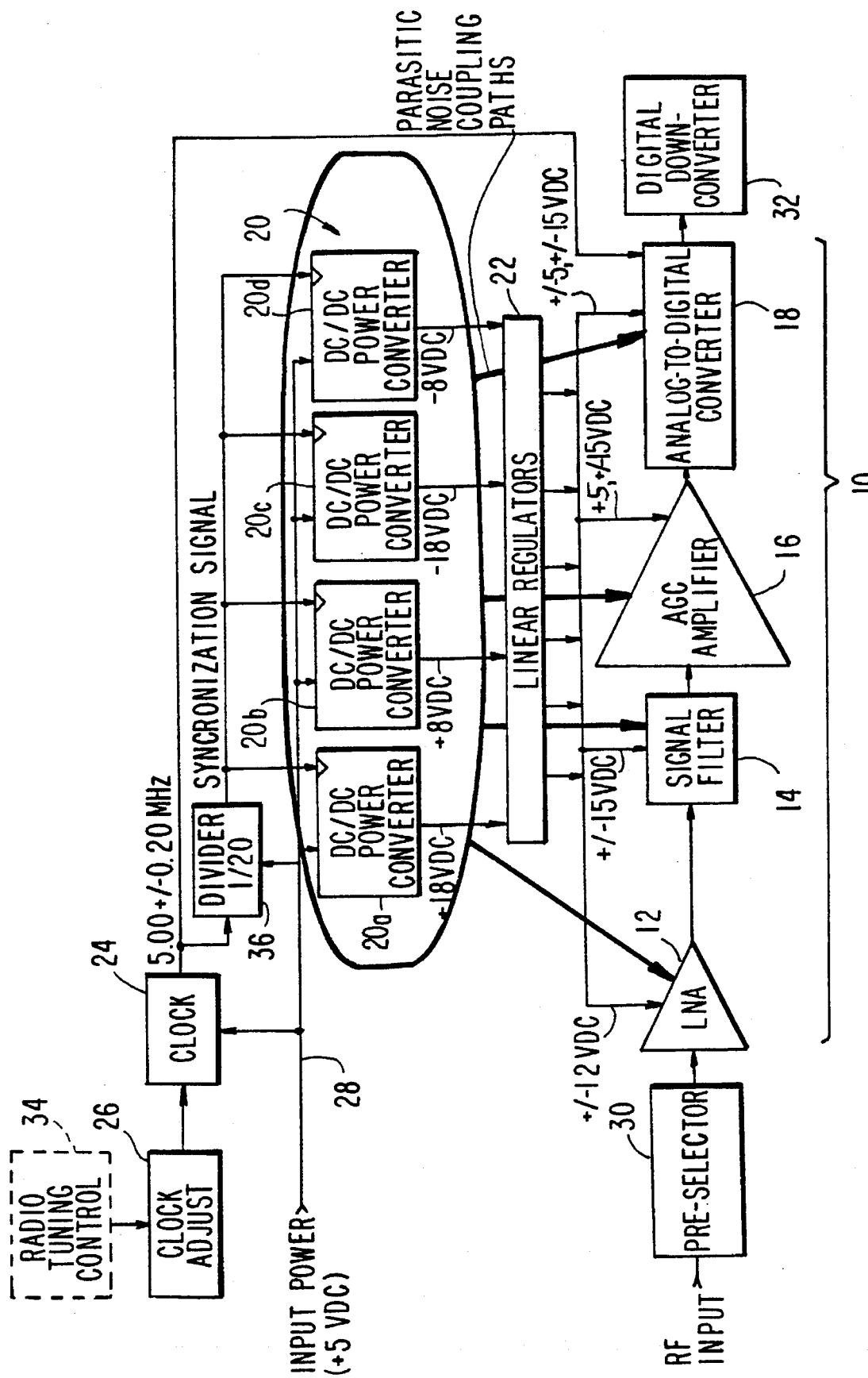
FIG. 4 is a block diagram of a representative radio system front end incorporating the present invention.

As shown in FIG. 1, a switching power converter having a switching oscillator operating at a fundamental switching frequency $F_{sw}$ generates signals, considered to be "noise" to other electronics equipment, at both the fundamental switching frequency as well as at the harmonics or multiples of that frequency. These frequencies have the capability of overlapping with the frequency or frequency range of interest for a particular application. For a radio front end, for example, the band of interest may represent all or a portion of the radio frequency passband across which the radio is to operate. In FIG. 1 the band of interest Pb is shown as fortuitously lying between the third and fourth harmonics of the fundamental frequency. In such a case, there is no interference between the power supply and the operation of the radio.

While the noise components shown in the Figure are presented as single frequency lines, in reality the noise components are not infinitely narrow, but exist over a range of frequencies, due to operating frequency drift, phase noise and other parasitic modulations. Therefore, a sufficient buffer zone must be allowed between the frequency or frequencies of interest and the noise components. While additional generated noise, at frequencies other than the fundamental or harmonics of the fundamental switching frequency often exist, these emissions are typically negligible and are of little concern when known proper circuit design techniques are followed.

As the band of interest shifts upwardly or downwardly, such as a result of tuning of a radio front end, conflict between the band of interest and the switching frequency and its harmonics can occur, as shown in FIG. 2. Such interference degrades performance of the apparatus in such overlapping regions. One skilled in the art will readily recognize that in addition to the passband of a receiver, there may be other specific frequencies or frequency bands which, in the context of the present disclosure, may be considered "sensitive", the minimization of overlap and interaction with the power converter switching frequency and its harmonics can be of benefit to performance of the apparatus.

The present invention permits the fundamental switching frequency $F_{sw}$, and thus the harmonics of the switching power supply, to be chosen and adjusted to minimize or eliminate overlap between such switching frequencies and the sensitive frequencies. By referencing the operating frequency for the switching oscillator to the sensitive frequencies, the switching frequency can be chosen and varied on a continuing real time basis as may be required to maintain a continued minimization of interference between the switching noise and the sensitive frequencies.

Because the frequency of operation for the switching power supply is chosen with specific consideration of the actual operating frequencies of the associated electronics, the present invention is also of significant value when the associated equipment utilizes the conversion of an analog signal to a digital form, such as in the case of a digital radio front end, in which an analog signal is sampled at a given frequency. As shown in FIG. 3, a sampling frequency $F_s$ for such a device has ascribed to it a Nyquist bandwidth $N_{bw}$, equal to one half of the sampling frequency. Although this frequency band is not necessarily subject to direct interference with the converter switching frequency or its harmonics, higher order harmonics of the switching frequencies are capable of "folding" or "imaging" back, appearing as interference at frequencies $F_i$ below the fundamental switching frequency, due to their relationship to the sampling frequency. These noise images can cause interference in the same manner as the switching frequency fundamental and harmonics. The present invention allows for the adjustment of the frequency $F_{sw}$ of the converter oscillator to locate its harmonics at frequencies which image back at points which minimize their interference.

FIG. 4 presents in block diagram form an illustrative system in which the present invention may be embodied. In particular, the presented system represents a high frequency radio receiver front end incorporating analog to digital signal processing techniques as known in the art. The present invention allows the use of one or more power converters wherein the conversion frequency is adjusted such that it, as well as its harmonics and the images of its harmonics, are continuously relocated to continuously provide minimal interference with the sensitive frequencies of the receiver, which may vary on a dynamic basis.

As shown in the Figure, the receiver's analog to digital front end 10 can include a plurality of elements including a low noise amplifier 12, a signal filter 14, an automatic gain control amplifier 16, and an analog to digital (a/d) converter 18 which require a variety of DC voltages from power converters 20a–d and which are further subject to the switching noise resulting from the operation of the converters. The assemblage of such elements may receive an RF input from a pre-selector 30 and deliver a digital data signal output to a digital down-converter 32. While the power converters are shown in the figure as discrete units, it is well appreciated by those skilled in the art that the provision of various voltages may be provided by independent power converter circuits operative in synchronism or by a unitary supply providing a plurality of voltages from a single converter system. The outputs of the power converters are directed to the required circuit components through linear voltage regulators 22.

A main clock 24 provides synchronizing pulses for both the power converters 20a–d as well as the analog to digital converter 18 of the radio front end and thus sets the operating frequencies therefor. For a radio operating in the tuning range of approximately 1.8 to 2.3 MHz, the clock 24 may have a nominal frequency of 5 MHz, adjustable by plus or minus 0.2 MHz. The actual frequency of the clock is controlled by clock adjust means 26.

In a preferred embodiment, the clock adjust means 26 may comprise a microprocessor having data derived from the tuning mechanism or control 34 for the radio front end as an input. The microprocessor may be further provided with data relating to the harmonic output of the power converter 20 over the range of drive frequencies intended to be utilized, and may also have available to it data associated with the sensitive frequencies and frequency ranges as associated with the tuning of the front end. Such data may be in the form of table lookups in memory or may be in the form of appropriate algorithms as known in the art which would allow harmonic and interference data to be computed and determined with reference to the converter and front end sensitive frequencies on a real time basis as front end tuning occurs.

In the embodiment presented, clock 24 directly defines the operating speed for the a/d converter 18, and further controls the operating frequency for the power converter 20 by passage through frequency divider 36, which in the illustrative embodiment may be a divide by 20 circuit. The output of the divider 36 provides a synchronous signal for the choppers or oscillators in each of the power converters, which act upon the main power input 28. As presented, adjustment of the clock frequency varies both the a/d converter operating frequency as well as the power converter chopping frequency.

With an illustrated input frequency band of interest lying in the range of 1.8–2.3 MHz, it is contemplated that varying the frequency of the clock 24 from 4.8–5.2 MHz, in conjunction with a 1/20 frequency division for the power converters 20, will allow the noise generated by the converters to be located at frequencies at other than the particular sensitive frequencies associated with the actual frequency that is tuned to at that particular time by the front end. Clock adjust 26 may be provided with the appropriate algorithm to convert the tuned frequency input to the appropriate clock frequency on a real time basis. Simultaneous adjustment of both the sampling rate for the a/d converter 18 and the one-twentieth frequency of the converter chopping frequency which results from clock speed adjustment combine to maintain a minimum-interference condition while the front end is tuned across the band of interest.

If the band of interest extends over a range which is smaller than the switching frequency, it may be possible to maintain the switching frequency at a constant value, by setting the clock frequency such that the power converter noise continuously straddles the band of interest. When the switching frequency must be adjusted, such adjustment may be realized by either selecting from a group of preset frequencies, calculated to provide an acceptable limited level of interference, or may be realized by continuous adjustment whereby an optimum frequency is determined with specific reference to the frequency or frequencies tuned.

As depicted in the disclosed embodiment, the present invention allows for the simultaneous adjustment of both the chopping frequency of the power converter, as well as the operating frequency for a particular element (the a/d converter) of the electronics system which the power converter drives, and whose operating frequency can have an effect on the ultimate power converter noise spectrum. Control of the frequency of one of the elements alone, and preferably the converter, however, can also be utilized, and may be required when the associated electronics system does not include components which allow for such compound operating frequency adjustment. Suitable programming for the clock adjustment, as known in the art, can accommodate such conditions.

I claim:

1. A switching power supply comprising voltage conversion means for converting an input potential at a first voltage to one or more output potentials at one or more voltages, said voltage conversion means comprising a variable frequency oscillator for chopping said input potential; means for determining at least one sensitive frequency of an electronics unit subject to interference generated by said power supply; and means for adjusting said variable frequency oscillator to an operating frequency whereby the spectral content of noise generated by said variable frequency oscillator and power supply causes minimal interference with said at least one sensitive frequency.

2. The apparatus of claim 1, wherein said means for determining said at least one reference frequency comprises means for monitoring at least one operating frequency of said electronics unit during operation thereof.

3. The apparatus of claim 2, wherein said electronics unit is a radio receiver and said means for determining said at least one sensitive frequency comprises means coupled to a tuning control for said radio receiver.

4. The apparatus of claim 1, wherein said means for choosing the operating frequency of said oscillator comprises a microprocessor.

5. The apparatus of claim 3, wherein said adjustment means comprises means for assigning said operating frequency for said oscillator at a frequency at which said oscillator frequency and its harmonics are non-coincident with said operating frequency of said radio.

6. The apparatus of claim 2, wherein said electronics unit includes a component capable of generating images of said operating frequency and said means for adjusting said variable frequency oscillator comprises means for choosing said operating frequency to minimize interference between said images and said at least one sensitive frequency.

7. An apparatus for minimizing interference between a switching power supply and an associated electronics device, comprising a switching power supply having voltage conversion means including a variable frequency chopping oscillator for converting an input potential at a first voltage and frequency to one or more output potentials at one or more voltages; an electronics device powered by said switching power supply having at least one sensitive frequency capable of receiving interference from said power supply and having an element capable of operation over a range of drive frequencies; means for determining the degree of interference between the frequency of said chopping oscillator and said at least one sensitive frequency; and means for adjusting at least one of the operating frequencies of said variable frequency oscillator and electronics device element to an operating frequency whereby the degree of power supply interference with said at least one sensitive frequencies is at a minimum.

8. The apparatus of claim 7, wherein said electronics device element is an analog to digital converter.

9. The apparatus of claim 8, wherein said electronics device is a radio front end.

10. The apparatus of claim 8 further comprising a variable frequency output clock coupled to said chopping oscillator and said analog to digital converter.

11. The apparatus of claim 10, wherein said adjustment means comprise means to vary the output frequency of said clock.

12. An apparatus for minimizing interference between a switching power supply and an associated electronics device, comprising a switching power supply having voltage conversion means including a variable frequency chopping oscillator for converting an input potential at a first voltage and frequency to one or more output potentials at one or more voltages; an electronics device powered by said switching power supply having at least one sensitive frequency capable of receiving interference from said power supply; means for determining the degree of interference between the frequency of said chopping oscillator and said at least one sensitive frequency; and means for adjusting the operating frequency of said variable frequency oscillator to an operating frequency whereby the degree of power supply interference with said at least one sensitive frequencies is at a minimum.

13. A method for minimizing interference between a switching power supply having voltage conversion means including a variable frequency chopping oscillator for converting an input potential at a first voltage and frequency to one or more output potentials at one or more voltages and an associated electronics device subject to power supply interference at one or more sensitive frequencies associated with the operation of said device, comprising the steps of:

identifying the one or more sensitive frequencies; and varying the operating frequency of said chopping oscillator to a frequency whereby the level of power supply interference with said at least one sensitive frequencies is at a minimum.

14. The method of claim 13 comprising the further step of performing said identifying and varying steps on a continuing real time basis to accommodate operating variations in said one or more sensitive frequencies.

15. The apparatus of claim 1, wherein said means for adjusting said variable frequency oscillator provides adjustment in operating frequency on an ongoing basis.

16. The apparatus of claim 7, wherein said means for adjusting at least one of the operating frequencies of said variable frequency oscillator and electronic drive element provide adjustment in operating frequency on an ongoing basis.

* * * * *